June 3, 1958   P. B. HULTKRANS ET AL   2,836,941
ART OF PACKAGING COMMODITIES IN EXPANSIBLE WRAPPERS
Filed June 29, 1953
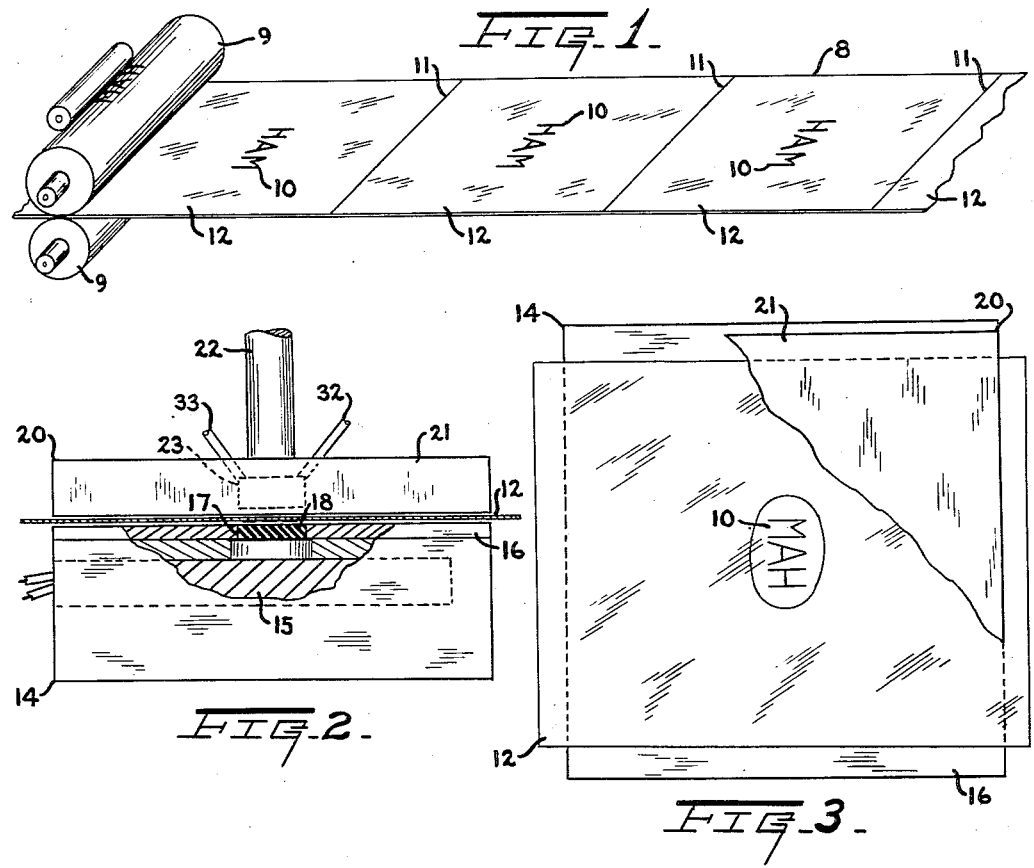
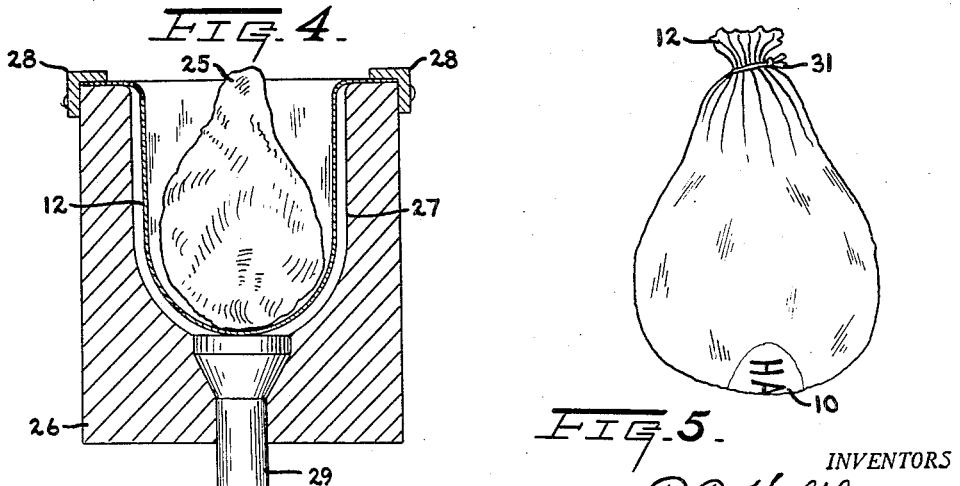
INVENTORS
P. B. Hultkrans
BY D. A. Perino
Lieber & Lieber
ATTORNEYS.

United States Patent Office 2,836,941
Patented June 3, 1958

2,836,941

ART OF PACKAGING COMMODITIES IN EXPANSIBLE WRAPPERS

Paul B. Hultkrans and Dominic A. Perino, Milwaukee, Wis., assignors to Milprint, Inc., Milwaukee, Wis., a corporation of Delaware Application June 29, 1953, Serial No. 364,592

4 Claims. (Cl. 53—14)

The present invention relates generally to improvements in the art of packaging commodities in wrappers of expansible or stretchable sheet materials, and relates more particularly to an improved method of protectively packaging meats and similar commodities in pre-printed wrapper sheets adapted to be stretched upon application of heat during the packaging operation.

A primary object of this invention is to provide an improved new and useful method of effectively encasing perishable commodities in protective casings or wrappers of heat-stretchable materials without distortion of the printed matter previously applied thereto.

In the packaging of meats and similar perishable commodities for protective purposes, it has heretofore become common practice to utilize expansible or stretchable films produced from thermo-plastic or elastomer materials such as rubber hydrochloride and commercially known as "Pliofilm," such films either being used in the form of wrapper sheets or being pre-fabricated as seamed or seamless tubing, bags or pouches. While such rubber hydrochloride films and sheets of certain other thermoplastic or elastomer materials have been found to possess desirable qualities and have therefore been extensively and successfully used for protective wrapping or packaging purposes, it is preferable that these materials be specially treated by a tensilizing process in the presense of heat in order to prevent subsequent undesirable stretching and resultant looseness of the wrapper in the final package assembly; and in efforts to overcome this objection and to provide a neat and attractive tightly wrapped package, various methods of treatment and different types of apparatus have heretofore been proposed. One such prior method of treatment of these thermoplastic or elastomer films comprises the formation of a tube which is subsequently laterally, and sometimes longitudinally, stretched in the presence of heat and thereafter set by a cooling action while in flattened condition to provide a tensilized tube which may thereafter be printed on a rotary press and cut into sections for use as sausage casings or the like; and while such tube tensilizing process has enjoyed considerable commercial success, the use of the tube sections thus produced is restricted in application to food products such as ground meats for sausages and the like wherein the product to be encased readily conforms to the shape of the expanded casing. Another prior method of film tensilization consists in the formation of tube sections or bags of previously untreated or untensilized films which are thereafter individually expanded or stretched by means of an expanding mandrel in the presence of hot water and subsequently set in such stretched condition by cooling, but such tensilization treatment is highly objectionable due to the slow and tedious individual treatment required for each section or bag and the problems encountered in separately printing the sections by hand fed platen presses after tensilization thereof to avoid distortion of the printing as well as the restricted application of the sections or bags to commodities which readily conform to the shape and size of the packaging receptacle. A somewhat similar known method of film stretching or tensilization consists in the formation of previously untensilized tube sections or bag-like containers which are individually immersed in hot water or the like immediately prior to filling the same with the commodity which, when injected or forced into the casing or receptacle, stretches the film about the product with the final setting of the film being accomplished by cooling the finally wrapped or encased commodity; and while the application of this method is not quite as restricted to pliant products but may be more generally applicable to more-or-less irregularly and definitely shaped commodities, the problems of printing are even more prevalent since the films cannot be printed after the commodity is encased therein and any previously applied indicia will be objectionably distorted during the packaging and stretching operation. Finally, it has also been proposed to utilize flat sheets of untensilized film which may likewise be heated immediately prior to the wrapping operation, the heated sheets being stretched or expanded to a considerable extent by inserting the commodity and simultaneously drawing a vacuum against the outer side of the sheet to stretch the sheet or film in order to receive the commodity, and thereafter closing and sealing the wrapper about the commodity and cooling the final package so as to set the film in such expanded or stretched condition; but in such method, the same serious problem of printing the wrapper without resultant distortion of the indicia is also present.

It is therefore a more specific object of the present invention to provide an improved method of preparing expansible wrapper sheets and packing commodities therein which obviates all of the disadvantages and objections attendant prior methods.

Another specific object of the invention is to provide a new and improved method of tensilizing a pre-printed wrapper sheet of heat-stretchable material, whereby the previously applied printed indicia is not undesirably distorted during the tensilizing and packaging operation.

Another specific object of this invention is to provide an improved method of stretch-wrapping commodities of relatively irregular shapes in pre-printed thermo-plastic or elastomer wrapper sheets in a most economical and efficient manner and with a minimum number of steps.

A further specific object of our invention is to provide an improved method of packing or wrapping diverse commodities in attractive printed wrapper sheets of heat-stretchable materials to provide a neat and durable final package in which the commodity is protectively and snugly confined.

An additional specific object of the present invention is to provide an improved method of packaging a commodity in a printed wrapper of thermo-plastic material, which comprises, subjecting only the unprinted area of the wrapper to heat sufficient to render such area expansible while isolating the printed area from the heat, thereafter stretching the unprinted portion of the wrapper while in such expansible condition to substantially conform the wrapper to the shape of the commodity to be packaged, and finally closing the wrapper about the commodity to confine the commodity therein.

These and other specific objects and advantages of the invention will be apparent from the following detailed description.

A clear conception of the several steps constituting the improved packing method, and of the general construction and mode of utilizing typical apparatus for conveniently exploiting the improved method, may be had by referring to the drawing accompanying and forming a part of this specification wherein like reference characters designate the same or similar parts in the several views.

Fig. 1 is a fragmentary perspective view of a printed web of thermo-plastic or elastomer material forming successive wrapper sections, and showing the web as it leaves the printing rolls of an ordinary rotary press;

Fig. 2 is a fragmentary part-sectional side view of a typical heater for performing the step of pre-heating only the unprinted area of an individual wrapper sheet shown positioned therein;

Fig. 3 is a top view of the heater with the pressure pad broken away to more clearly reveal the position of the wrapper sheet on the heating table;

Fig. 4 is a transverse vertical section through a typical suction unit for performing the wrapper stretching step, and showing a pre-heated wrapper in stretched condition therein with a ham positioned within the stretched wrapper; and Fig. 5 is a side view of a package produced in accordance with the improved method and showing the wrapper closing and sealing step.

While the present improved method has been particularly shown and described herein as being especially applicable in the packaging of meats such as hams, pork loins and the like in thermoplastic films such as "Pliofilm" in the form of single thickness flat wrapper sheets, it is not desired or intended to thereby unnecessarily restrict or limit the scope of the invention which might obviously be advantageously applicable in the packing of other commodities in tubes or bag-like containers formed of any suitable materials adapted to become expansible upon application of heat while remaining relatively inelastic and normal in the absence of heat. Accordingly, it is contemplated that certain specific descriptive terms used herein shall be given the broadest possible interpretation consistent with the disclosure, and that the terms "thermoplastic" and "elastomer" as herein referred to shall be understood to include any material which is normally relatively stable and inelastic but which becomes expansible in the presence of heat.

In accordance with the present improved method of packaging commodities such, for example, as hams, a web or film 8 of suitable thermoplastic or elastomer material such as rubber hydrochloride, which is relatively stable and inelastic under normal conditions but which becomes quite expansible or stretchable when subjected to heat, is first continuously advanced between the rolls 9 of a standard rotary press in the usual manner to apply local printed indicia 10 to spaced confined areas of the web 8 which may be subsequently severed along transverse lines 11 to provide successive similar individual flat printed wrapper sheets 12.

Next, each of the individual thermoplastic wrapper sheets 12 bearing the desired local printed indicia 10 is subjected to heat over only such major area thereof as is devoid of printing, sufficient heat being applied to render such unprinted area expansible or stretchable and suitable means being taken to isolate the local and confined area immediately surrounding the printed indicia 10 from the heat; and while any suitable apparatus may be utilized to perform this heating step, the heater shown in Figs. 2 and 3 comprises generally, a heating table or hot plate 14 having an internal electric heating element 15 and a wrapper surface engaging plate 16 of heat conducting metal such as aluminum provided with an opening 17 corresponding approximately to the locally printed area 10 of the wrapper 12 and preferably filled with suitable non-heat-conducting insulating material 18, and an upper pressure member 20 having a pressure pad 21 of substantially the same size as the plate 16 and the wrapper 12 carried by an actuating rod 22 and adapted to clamp and retain the wrapper sheet 12 in position on the heating table 14, the pressure pad 21 being provided with a suitable cooling chamber 23 of similar contour as the insulated opening 17 in the heat conducting plate 16 if desired or found necessary to additionally isolate the printed area 10 of the wrapper 12 from the heat.

Thereafter, the unprinted portion of the wrapper 12 is stretched while still in expansible condition so as to substantially conform the wrapper to the shape of the commodity 25 to be protectively wrapped or packaged, such stretching preferably being accomplished by subjecting one side of the wrapper 12 to a vacuum while the commodity 25 is simultaneously inserted from the opposite side; and as shown in Fig. 4, a suitable simple stretching device may consist generally of a suction mold or block 26 having a cavity or recess 27 of substantially the same shape and size as the commodity 25 and provided with peripheral clamping elements 28 for retaining the edges of the wrapper 12 in position as a vacuum is drawn through the suction conduit 29 communicating with the lower portion of the cavity 27 in an obvious manner to thereby stretch the heated unprinted area of the wrapper and distort the same to receptacle formation.

Finally, the open end of the wrapper 12 is closed and retained closed in a suitable manner, as by means of a cord 31, and the finally sealed package may then be sprayed or wiped with a cooling liquid or it may be refrigerated or otherwise permitted to cool to set the same in close intimacy with the confined commodity as shown in Fig. 5.

From the foregoing detailed description, it is believed apparent that the present invention contemplates provision of an improved commodity packing and wrapper tensilization method which is extremely simple and efficient in actual commercial exploitation, and which may moreover be rapidly effected with the aid of simple apparatus. By reason of the improved method, a continuous web of the thermoplastic film may be printed on a standard rotary press with the individual wrapper sheets 12 being cut from the printed web 8; and by heating only the unprinted area of each wrapper sheet to render the same expansible for the subsequent stretching operation, the isolated unheated printed area of the wrapper remains substantially free from distortion during such stretching due to the relative stability and inelasticity of the material when retained in unheated condition. The unheated area may therefore be utilized to advantage in printing any desired identification or the like, and such printed indicia will remain clearly legible after packaging in the stretched and tensilized wrapper. While the printed area may be sufficiently isolated from the heat by merely leaving an opening 17 of the necessary size and shape in the heater plate 16, the insulation 18 may be readily applied within the opening 17, and the printed area may be further cooled by circulating cooling fluid within the chamber 23 in the pressure pad 21 through suitable inlet and outlet conduits 32, 33 respectively. As hereinabove indicated, the improved method may be readily utilized in the packaging of diverse commodities of various shapes and sizes, and the printing on the wrappers may, of course, be varied widely as desired and may be located in more than one place on the wrapper. Likewise, the apparatus used in performing the various steps may also be varied, and the method is applicable to any sheet materials adapted to be stretched upon application of heat and to remain relatively stable and inelastic in the absence of heat.

It should be understood that it is not desired or intended to limit the present invention to the exact steps of the method, or to the precise construction of the apparatus, herein shown and described, since various modifications may occur to persons skilled in the art to which this invention pertains.

We claim:

1. The method of packaging a commodity, which comprises, initially printing indicia on a selected local area of a wrapper sheet of thermoplastic material, thereafter subjecting only the major unprinted area of the wrapper sheet to sufficient heat to render the heated area expansible while isolating the local printed area of the wrapper sheet from the heat and simultaneously cooling the isolated area sufficiently to cause the printed area to retain its normal stability, subjecting the wrapper sheet to a stretching operation while the major unprinted area only thereof is still in expansible condition to thereby stretch the same while shaping the wrapper sheet to substantially accommodate the commodity to be packaged, and finally closing the wrapper sheet about the commodity to confine the same therein.

2. The method of packaging a commodity, which comprises, initially printing indicia on a selected local area of a wrapper sheet of thermoplastic material, thereafter subjecting only the major unprinted area of the wrapper sheet to sufficient heat to render the heated area expansible while isolating the local printed area of the wrapper sheet from the heat and simultaneously cooling the isolated area sufficiently to cause the printed area to retain its normal stability, clamping the marginal portions of the wrapper sheet outwardly beyond the printed area thereof and subjecting the sheet to a stretching operation while the major unprinted area only thereof is still in expansible condition to thereby stretch the same while shaping the wrapper sheet to substantially accommodate the commodity to be packaged, and finally closing the wrapper sheet about the commodity to confine the same therein.

3. The method of packaging a commodity, which comprises, initially printing indicia on a selected local area of a wrapper of thermoplastic material, thereafter subjecting only the major unprinted area of the wrapper to sufficient heat to render the heated area expansible while isolating the local printed area of the wrapper sheet from the heat and simultaneously cooling the isolated area sufficiently to cause the printed area to retain its normal stability, subjecting the wrapper to a stretching operation while the major unprinted area only thereof is still in expansible condition to thereby stretch the same and shape it to conform to the commodity to be packaged, and finally closing the wrapper about the commodity to confine the same therein.

4. The method of packaging a commodity, which comprises, initially printing indicia on a selected local area of a wrapper of thermoplastic material, thereafter subjecting only the major unprinted area of the wrapper to sufficient heat to render the heated area expansible while isolating the local printed area of the wrapper sheet from the heat and simultaneously cooling the isolated area sufficiently to cause the printed area to retain its normal stability, subjecting the wrapper to a stretching operation while the major unprinted area only thereof is still in expansible condition to thereby stretch the same, and thereafter deforming the wrapper to conform it to the commodity to be packaged.

References Cited in the file of this patent
UNITED STATES PATENTS

| | | |
|---|---|---|
| 2,210,509 | Strauch | Aug. 6, 1940 |
| 2,289,668 | Mallory | July 14, 1942 |
| 2,327,170 | Calvert | Aug. 17, 1943 |
| 2,403,482 | Cloud | July 9, 1946 |